(No Model.)  2 Sheets—Sheet 1.
F. DE LALANDE.
GALVANIC BATTERY.
No. 479,887. Patented Aug. 2, 1892.
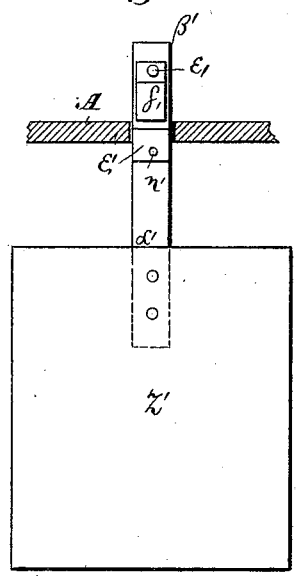
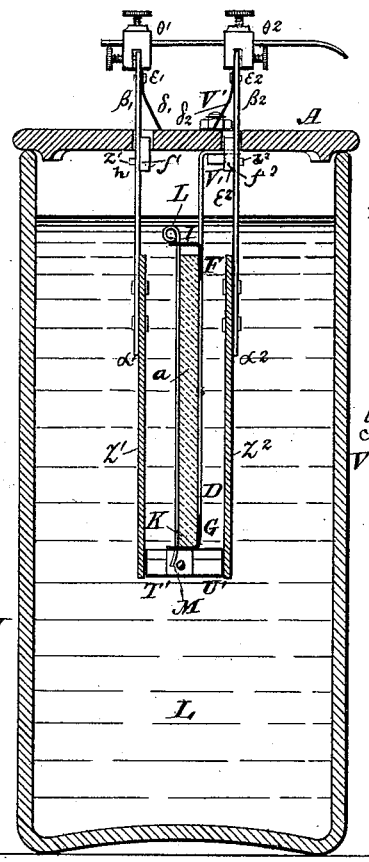
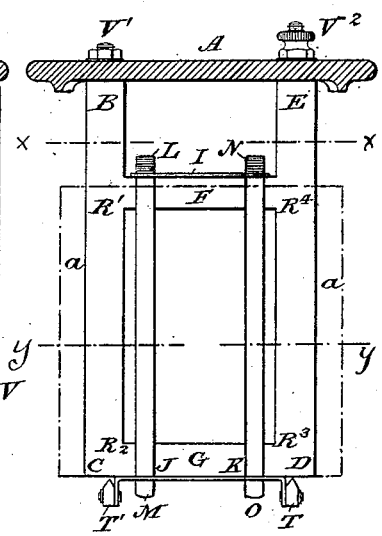
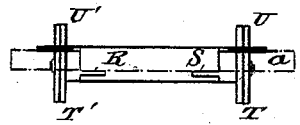
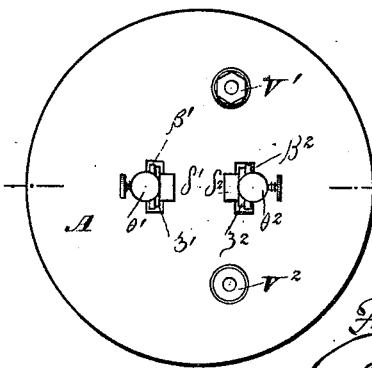
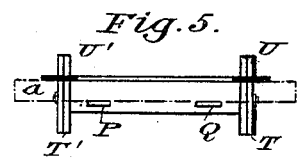
Witnesses:
J. B. Bolton
H. Husterer
Inventor:
Félix de Lalande
By Richards
his Attorneys.
THE NORRIS PETERS CO., PHOTO-LITHO., WASHINGTON, D. C.

(No Model.) 2 Sheets—Sheet 2.
F. DE LALANDE.
GALVANIC BATTERY.

No. 479,887. Patented Aug. 2, 1892.

Witnesses:
E. B. Bolton
M. W. Walsh

Inventor:
Félix de Lalande
By Richardson
his Attorneys.

UNITED STATES PATENT OFFICE.

FÉLIX DE LALANDE, OF PARIS, FRANCE.

GALVANIC BATTERY.

SPECIFICATION forming part of Letters Patent No. 479,887, dated August 2, 1892.

Application filed June 27, 1891. Serial No. 397,749. (No model.) Patented in France May 28, 1890, No. 205,952.

*To all whom it may concern:*

Be it known that I, FÉLIX DE LALANDE, a citizen of the French Republic, residing at Paris, in the Department of the Seine, France, have invented certain new and useful Improvements in Galvanic Batteries, (for which I have obtained a patent in France, dated May 28, 1890, No. 205,952;) and I hereby declare that the following is a full, clear, and exact description of the same.

My invention relates to an improvement in electric batteries; and it consists in an improvement upon the battery shown in Patent, No. 274,110 of March 20, 1883. The object is to simplify and render more practical the battery therein described. The battery comprises a negative electrode formed of a plate of copper oxide having a conducting-surface and fixed to a metallic support of a peculiar form, and it also comprises a positive electrode made of a sheet of zinc fixed to a metallic sheet provided with a spring. These positive and negative electrodes are carried by the cover of the battery and immersed in the exciting-liquid formed of a solution of potash or caustic soda. Throughout this specification the copper and zinc elements are called plates, though they may be made as hereinafter described.

Figure 8:
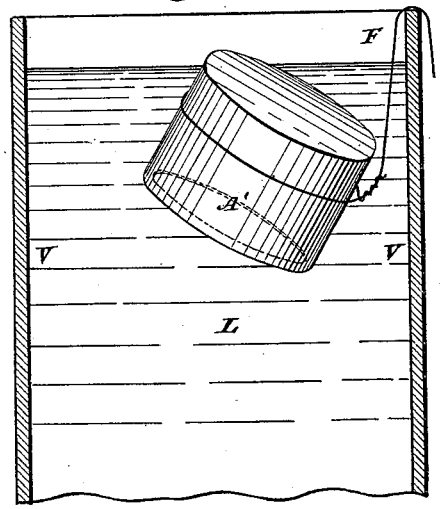
Figure 9:
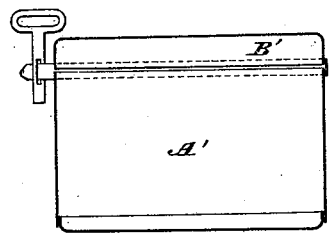

In the accompanying drawings, illustrating my invention, Figure 1 shows a vertical section of the battery. Fig. 2 is a face view of the support for the agglomerated copper-oxide plates. Fig. 3 is a top view of the cover. Figs. 4 and 5 are horizontal sections of this support on lines $x\,x$ and $y\,y$, respectively, Fig. 2, a portion being removed. Fig. 6 shows a detailed view of a spring-pin. Fig. 7 is a face view of the zinc plate. Fig. 8 shows one of my vessels for holding potash. Fig. 9 shows the fastening of the bottom of said vessel.

In the drawings, A A is a cover of porcelain or other suitable material.

B C D E is the support for the copper-oxide plate $a$, fixed by the spring-pins L M N O.

$Z'\,Z^2$ are zinc plates; V V, the glass jar; L, the exciting-liquid.

The copper-oxide plates can be made either by one of the processes described in Patent No. 274,110 mentioned above, or by the following process: Scales of copper or copper oxide of any origin are mixed with five to eight per cent. of tar, and this mixture is ground in a press under a pressure of fifty to one hundred kilograms, for instance, to the square centimeter of the surface. The matter thus ground to the suitable form is withdrawn from the press and placed on pieces of refractory earth or raw iron, and is heated to a temperature of 400° to 600° centigrade. Under the influence of the heat the copper oxide is reduced to a metallic state and the agglomeration is produced. By subsequent action the copper thus reduced and agglomerated oxidizes in the atmosphere of the furnace, and this oxidation penetrates little by little to the center of the mass. The plates are then withdrawn from the furnace. Other suitable materials may be substituted for the tar.

To obtain the metallization of the surface of the agglomerated copper-oxide plates, their surface is covered with a thin layer of powdered zinc, either by applying with a brush this matter diluted in a small quantity of water or by placing the plate for several seconds into the water, in which the powdered zinc is maintained in suspension by a mechanical agitator. The plates thus covered with zinc can be used immediately in the battery. In this case this zinc reduces the surface rapidly to the metallic state by dissolving in the caustic potash, or else they are placed during several hours in slightly-acidulated water until the zinc be dissolved and the surface transformed into metallic copper as used now in the batteries. These plates have quite a good conducting capacity; but if after having been washed they are to be dried the reduced copper on the surface, which is very porous, oxidizes and the conducting quality is lost. To obviate this, the plates on being taken out of the acid bath are put in a galvanoplastic bath of sulphate of copper and subjected to the action of an electric current, giving an intensity of two to three ampères to the square decimeter of the surface of the copper-oxide plate under the influence of this intense current, and which then is covered in a few minutes with a continuous layer of copper sufficiently thin and porous as not to introduce any resistance in the batteries where it is used. It suffices then to wash and dry these agglomerations. The deposited copper will not reoxidize. The plates must be maintained in contact with a metallic support which is not affected by the exciting-liquid. I use for this purpose a copper support, or, more economically, an iron one, which can be covered by a thin layer of copper or of nickel to avoid oxidation before it is put to work. I give this support the form shown in Figs. 1, 2, 3, 4, and 5. It is obtained, for instance, by cutting out with a die a leaf of sheet-iron, so as to have two vertical uprights B C D E united by the parts F G, the whole forming an open rectangle R' $R^2$ $R^3$ $R^4$. The parts I and J K are bent perpendicularly over on the surfaces F and G. The two uprights B C and E D are besides bent over at their upper part and fixed to the cover A A by means of screws V' and $V^2$ and nuts. One of these screws is provided with an adjusting-screw to receive the current. The plate $a$ (shown by dotted lines on the different figures) rests on the bent-over part J K. It is held in contact with the support by means of two pin-springs L M N O, formed by copper blades bent like L M, Fig. 6, forming a spring and passing through the eyes P Q and the slits R S, Figs. 4 and 5, which hold them strongly against the surface of the plate.

Fig. 6 shows a pin-spring before being put in place. Instead of these spring-pins, rubber ones may be used to fix the plates against their supports.

The separation of the zinc plates Z' and $Z^2$ is maintained by two pieces of ebonite T U T' U', cut slantingly and fixed by rivets to the end of the piece J K, raised perpendicularly to the surface J K. A blade of zinc or any piece of zinc put into a solution of potash or caustic soda is used up quite rapidly in consequence of the oxidation of the zinc and the dissolution of the oxide formed. The addition to the surface of the liquid of a layer of heavy petroleum does not positively guard the zinc from being cut. The use of brass or copper blades amalgamated with mercury to support the zinc obviates this drawback; but then these supports must be quite thick, so as not to be too fragile in consequence of their amalgamation. I have found that tin is not corroded as long as it is in contact with zinc. It suffices, therefore, to tin the surface of the zinc a few millimeters above and below the point of immersion into the liquid to avoid the zinc being eaten at the level of the liquid. A support can also be used formed of any metal or alloy, provided it be tinned on its surface—for example, iron, copper, brass, &c. For instance, the zinc plates Z' and $Z^2$ are fixed to tinned iron blades L' B' $L^2$ $B^2$ by brass, tin, or tinned iron rivets.

The following arrangement admits of a rapid putting in or out of place of the zincs of a battery. On the blade L' B', to which the zinc is riveted, is fixed by means of a rivet $e$ a thin blade $d'$ of steel, forming a spring, of which the lower part is sufficiently distant L' B'. The cover of the battery is pierced by rectangular openings, into which the blades L' B' $L^2$ $B^2$ are introduced from below. By slightly pushing these blades in a vertical direction the springs S' $S^2$ bend, traverse these openings, and then take back their natural position. The zinc plates can then be left alone and remain suspended from the cover, their weight resting on the lower part of the springs S' and $S^2$. Moreover, metal pieces $f'$ $f^2$, fixed by rivets $z'$ $z^2$, limit the play of the pieces in the opening of the cover. The supports of the zinc are provided with movable pliers $o'$ $o^2$, to which the conductor is fixed.

The electrodes of the battery, as seen in Fig. 1, occupy only the upper part of the jar, without going down to the bottom. This arrangement has the purpose of keeping as long as possible the electrodes out of the inactive solution of the zincate of potash, which forms and falls to the bottom of the jar on account of its great density.

Various minor modifications and changes can be made in the form and construction of the apparatus without departing from the bent of the invention.

The potash charges are generally furnished in fragments of greater or less size inclosed in tin boxes or stone pots. The breaking up of the commercial potash furnished in the form of large cylinders is a difficult and dangerous operation. It is difficult to keep the charges completely protected from the moisture of the air. Moreover, the dissolution of potash is effected only slowly in the batteries lest the liquid be repeatedly shaken up. To avoid these difficulties, I melt the large blocks of potash (mixed or not with a certain proportion of soda) and I pour the matter into tight metallic boxes A', supported in the liquid L of the vessel V by a wire F. The bottom B' of the vessel A' being simply fixed by means of a soldered band, Fig. 10, can easily be separated from the vessel, which is then placed in the liquid of the battery bottom first.

To mount the elements, it suffices to place on the glass jars about one-third filled with potash the covers provided with their positive and negative electrodes.

Having thus described my invention, what I claim, and desire to secure by Letters Patent, is—

1. As an article of manufacture, an electrode for galvanic batteries, consisting of an agglomerated mass of copper oxide having its surface reduced to a metallic state.

2. In a galvanic battery, an electrode and a support therefor, consisting of a frame having shoulders at the top and bottom to sustain the electrode, and a removable spring extending between the shoulders, substantially as described.

3. A support for an electrode, consisting of a metallic plate having a cut-out central portion, supports B E, depending from the cover, flanges I K for sustaining the electrode, and springs passing through openings in the said flanges, substantially as described.

4. In a galvanic battery, an electrode Z', a blade supporting the same and extending through an opening in the cover, and a spring-support for said blade, resting on the top of the cover, substantially as described.

5. In combination with the electrode Z', a supporting-blade passing through an opening in the cover, a limiting-piece $f'$, secured to the blade, and a spring-support for the blade, secured thereto and resting on the cover, substantially as described.

6. In combination with the zinc plates Z' and $Z^2$ and their supports, the electrode $a$ and its support, and spacing-pieces T T' U' of insulating material, secured to the support of the electrode $a$ and adapted to keep the zinc plates apart, substantially as described.

In witness whereof I have hereunto set my hand in presence of two witnesses.

FÉLIX DE LALANDE.

Witnesses:
ROBT. M. HOOPER,
JULES FAYOLLET.